United States Patent
Moriyama et al.

(10) Patent No.: US 6,914,098 B2
(45) Date of Patent: Jul. 5, 2005

(54) ACRYLIC ELASTOMER AND ITS COMPOSITION

(75) Inventors: Iwao Moriyama, Takahagi (JP); Jun Okabe, Kitaibaraki (JP)

(73) Assignee: Nippon Mekiron, Limited, Tokyo (JP)

( * ) Notice: Subject to any disclaimer, the term of this patent is extended or adjusted under 35 U.S.C. 154(b) by 44 days.

(21) Appl. No.: 10/621,133

(22) Filed: Jul. 16, 2003

(65) Prior Publication Data

US 2004/0019154 A1 Jan. 29, 2004

Related U.S. Application Data

(62) Division of application No. 09/741,254, filed on Dec. 19, 2000, now abandoned.

(30) Foreign Application Priority Data

Dec. 24, 1999 (JP) ............................................ 11-366339

(51) Int. Cl.⁷ .............................................. C08F 265/02

(52) U.S. Cl. ....................................... 525/301; 526/318

(58) Field of Search ........................... 525/301; 526/318

(56) References Cited

U.S. PATENT DOCUMENTS

| | | | |
|---|---|---|---|
| 2,599,123 A | 6/1952 | Pinkney et al. |
| 3,883,472 A | 5/1975 | Greene et al. |
| 3,904,588 A | 9/1975 | Greene |
| 4,174,358 A | 11/1979 | Epstein |
| 4,782,110 A | 11/1988 | Wolf, Jr. |
| 2002/0037970 A1 | 3/2002 | Moriyama et al. |

FOREIGN PATENT DOCUMENTS

| | | |
|---|---|---|
| EP | 0 113 904 | 7/1984 |
| FR | 2240241 | 3/1975 |
| GB | 2247459 | 3/1992 |
| JP | 06-099515 | 4/1994 |
| JP | 11-140264 | 5/1999 |
| JP | 11-29366 | 10/1999 |

*Primary Examiner*—Bernard Lipman
(74) *Attorney, Agent, or Firm*—Butzel Long

(57) ABSTRACT

A butenedioic acid monoalkyl ester-copolymerized acrylic elastomer containing 0.1–30% by mole of unreacted butenedioic acid monoalkyl ester on the basis of carboxyl groups copolymerized in the acrylic elastomer or its cross-linkable composition. The cross-linkable composition can give cross-linking products having distinguished vulcanization characteristics and stably showing good compression set characteristics.

4 Claims, 1 Drawing Sheet

ACRYLIC ELASTOMER AND ITS COMPOSITION

RELATED APPLICATION

This application is a Divisional of U.S. patent application Ser. No. 09/741,254, filed on Dec. 19, 2000 now abandoned.

BACKGROUND OF THE INVENTION

1. Field of the Invention

The present invention relates to an acrylic elastomer and its composition and more particularly to an acrylic elastomer capable of giving stable compression set characteristics and its composition.

2. Related Art

Carboxyl group-containing acrylic elastomers, particularly acrylic elastomers in which the carboxyl groups of butenedioic acid monoalkyl ester act as cross-linking sites, are characterized by giving a cross-linking products with a distinguished compression set, free from any fear of corrosion of metal due to their non-halogenic properties per se by cross-linking reaction with a polyamine compound.

Such a rubbery material has good steam vulcanization characteristics and is effectively used in the field of strict requirements for compression set characteristics such as the field of sealing materials such as gaskets, oil seals, O-rings, etc. (JP-A-11-140264 and 11-269336) or the field of hose materials (JP-A-6-99515). However, vulcanization characteristics and compression set characteristics of such a rubbery material are much fluctuated and neither satisfactory compression set characteristics nor satisfactory vulcanization characteristics can be obtained, depending upon cases.

Furthermore, carboxyl group-containing acrylic elastomers, particularly butenedioic acid monoalkyl ester, are less copolymerizable with other acrylic monomers. For example, in case of maleic acid monoalkyl ester the esters undergo copolymerization only in such an amount as ⅓–¼ times the necessary one for cross-linking site formation, and thus must be charged in an increased amount, resulting in a large amount of remaining unreacted monomers.

SUMMARY OF THE INVENTION

An object of the present invention is to provide an acrylic elastomer capable of giving cross-linking products having distinguished vulcanization characteristics and stably showing good compression set characteristics and a composition thereof.

The object of the present invention can be attained by an acrylic elastomer, which comprises a butenedioic acid monoalkyl ester-copolymerized acrylic elastomer containing 0.1–30% by mole of unreacted butenedioic acid monoalkyl ester on the basis of the carboxyl groups copolymerized in the acrylic elastomer or by a cross-linkable composition thereof.

DETAILED DESCRIPTION OF THE INVENTION

Butenedioic acid monoalkyl ester-copolymerized acrylic elastomer for use in the present invention includes, for example, copolymers of at least one of alkyl acrylate and alkoxyalkyl acrylate with a monoalkyl ester of butenedioic acid such as maleic acid, fumaric acid, etc., for example, monoesters of methyl, ethyl, propyl, butyl, pentyl, hexyl, heptyl, octyl, 2-ethylhexyl, nonyl, decyl, undecyl, dodecyl, etc.

Alkyl acrylate includes, for example, alkyl acrylates with alkyl groups having 1–8 carbon atoms, such as methyl acrylate, ethyl acrylate, propyl acrylate, isopropyl acrylate, n-butyl acrylate, n-hexyl acrylate, 2-ethyl acrylate, n-octyl acrylate, etc., among which ethyl acrylate and n-butyl acrylate are preferable from the viewpoint of balance between oil resistance and low temperature resistance. Generally, the longer the chain of alkyl group, the more effective the low temperature resistance, the less effective the oil resistance, and vice versa.

Alkoxyalkyl acrylate includes, for example, alkoxyalkyl acrylates with alkoxyalkyl groups of 2–8 carbon atoms, such as methoxymethyl acrylate, 2-methoxyethyl acrylate, 2-methoxyethyl acrylate, 2-butoxyethyl acrylate, 2- or 3-methoxypropyl acrylate, etc., among which 2-methoxyethyl acrylate and 2-methoxyethyl acrylate are preferably used. These alkoxyalkyl acrylates have an ether group as a side chain and thus are distinguished in balance between low-temperature resistance and oil resistance.

Butenedioic acid monoalkyl ester-copolymerized acrylic elastomers can be further copolymerized, within such a range as not to deteriorate the characteristics (e.g. not more than about 30% by weight) with other vinyl or olefinic monomers such as styrene, vinyltoluene, α-methylstyrene, vinylnaphthalene, acrylonitrile, methacrylonitrile, acrylamide, vinyl acetate, cyclohexyl acrylate, phenyl acrylate, phenyl methacrylate, benzyl acrylate, 2-hydroxyethyl acrylate, 4-hydroxybutyl acrylate, ethyl vinyl ether, n-butyl vinyl ether, piperidine, butadiene, isoprene, pentadiene, etc.

Furthermore, to improve kneadability and extrudability, not more than about 1% by weight of such polyfunctional unsaturated monomers or oligomers can be copolymerized therewith, if required, such as ethylene glycol di(meth) acrylate, propylene glycol di(meth)acrylate, 1,4-butanediol di(meth)acrylate, 1,6-hexanediol di(meth)acrylate, 1,9-nonanediol di(meth)acrylate, neopentyl glycol di(meth) acrylate, tetraethylene glycol di(meth)acrylate, tripropylene glycol di(meth)acrylate, polypropylene glycol di(meth) acrylate, bisphenol A-ethylene oxide adduct diacrylate, dimethylol tricyclodecane diacrylate, glycerine dimethacrylate, 3-acryloyloxyglycerine monomethacrylate, etc.

Butenedioic acid monoalkyl ester-copolymerized acrylic elastomers can be prepared by an ordinary process for copolymerizing acrylic elastomers. Copolymerization reaction can be carried out at temperatures of about −10° to about 100° C., preferably about 5° to about 80° C., by any of emulsion polymerization, suspension polymerization, solution polymerization, bulk polymerization, etc., preferably by emulsion polymerization or suspension polymerization.

Polymerization initiator for use in the copolymerization reaction includes, for example, organic peroxides or hydroperoxides such as benzoyl peroxide, dicumyl peroxide, t-butyl hydroperoxide, cumyl hydroperoxide, p-methylene hydroperoxide, etc., diazo compounds such as azobisisobutyronitrile, azobisisobutylamidine, etc., peroxide salts such as ammonium salts typically ammonium persulfate, sodium salt, potassium salt, etc., which are used alone or as a redox system.

Emulsifier for use in the particularly preferable emulsion polymerization process includes, for example, anionic, cationic or nonionic surfactants, which can be used as an aqueous solution upon pH adjustment with an acid or a base and as a buffer solution prepared with an inorganic salt, if required.

Polymerization reaction is continued until the conversion of monomer mixture reaches at least 90%. The resulting aqueous latex is solidified by a salt-acid solidification process, a process using a salt such as calcium chloride, magnesium sulfate, sodium sulfate or ammonium sulfate, a process using a bron compound such as boric acid, borax, etc., a heat solidification process, a freeze solidification process, etc., and the resulting copolymers is fully washed with water and dried. The resulting acrylic elastomer has a Mooney viscosity $ML_{1+4}$ (100° C.) of about 10 to about 100, preferably about 20 to about 80.

Content of unreacted butenedioic acid monoalkyl ester in the acrylic elastomer must be 0.1–30% by mole, preferably 0.5–20% by mole, more preferably 1–15% by mole, on the basis of the copolymerized carboxyl groups in the acrylic elastomer.

When the content of the unreacted ester is more than 30% by mole, no cross-linking products having satisfactory compression set characteristics and vulcanization physical properties can be obtained. When the content is about 60% by mole, for example, vulcanization molding will be hard to conduct and also the stickiness will be higher during the kneading. When the content is less than 0.1% by mole on the other hand, it will take considerably longer time in post-treatment, etc. of aqueous latex resulting from the polymerization reaction then in the ordinary case. In the longer the treating time, the more deteriorated the process ability during the vulcanization molding or the knead-ability in some cases, or the higher the production cost as an economical problem, though the treatment can be made for a short time, depending on treatment processes.

Adjustment of the content of unreacted ester to the aforementioned range can be made by distillation with heating or under reduced pressure of unreacted ester in the aqueous latex state following the polymerization reaction, by adjusting the amount of washing water or water washing time after the solidification or by adjusting the dehydration or drying temperature, drying time, an air blow rate, etc. Determination of content of unreacted ester can be made by extracting unreacted ester into an organic solvent such as isopropyl ether, etc. from finely pulverized copolymer and gas chromatographically analyzing the extract. An amount of carboxyl groups in the copolymer can be determined by subjecting thoroughly water-washed, reprecipitated, water-washed and dried copolymer to neutralization titration to obtain an acid value, followed by calculation.

The resulting butenedioic acid monoalkyl ester-copolymerized acrylic elastomer containing unreacted butenedioic acid monoalkyl ester is subjected to vulcanization molding, using a polyamine or a polyfunctional isocyanate compound or blocked isocyanate, etc. as a cross-linking agent. In the former case, it is preferable to use a guanidine compound, a sulpheneamide compound, a tertiary amine, etc. as a vulcanization accelerator at the same tine, whereas in the latter case it is preferable to use an alkali metal salt of inorganic or organic acid, an alkali metal hydroxide, a quaternary onium salt, a guanidine compound, a tertiary phosphine, a tertiary amine, a sulpheneamide, etc. as a vulcanization accelerator at the same time.

Preferable polyamine compound cross-linking agent for use in the present invention includes aromatic polyamine compounds, such as 4,4'-methylenedianiline, m-phenylenediamine, 4,4'-diaminodiphenyl ether, p-phenylenediamine, p,p'-ethylenedianiline, 4,4'-(p-phenylene-diisopropylidene)dianiline, 4,4'-(m-phenylenediisopropylidene) dianiline, 3,4'-diaminodiphenyl ether, 4,4'-diaminodiphenylsulfone, 2,2-bis[4-(4-aminophenoxy)phenyl]propane, bis[4-(4-aminophenoxy)phenyl]sulfone, bis[4-(3-aminophenoxy)phenyl]sulfone, 4,4'-bis(4-aminophenoxy)biphenol, bis[4-(4-aminophenoxy)phenyl]ether, 2,2-bis[4-(4-aminophenoxy)phenyl]hexafluoropropane, 1,4-bis(4-aminophenoxy)benzene, 1,3-bis(4-aminophenoxy) benzene, etc. Preferably, p-diamino-substituted compounds are used.

Besides these aromatic polyamine compounds, aliphatic polyamine compounds such as hexamethylenediamine, hexamethylenediamine carbamate, hexamethylenediamine-cinnamaldehyde adduct, hexamethylene-diamine benzoate, diamino-modified siloxane, etc. or alicyclic polyamine compounds such as 4,4'-methylenebiscyclohexylamine, bis(4-amino-3-methyldicyclohexyl)methane, 4,4'-methylenebiscyclohexylamine-cinnamaldehyde adduct, etc. can be also used.

Furthermore, hydrazine compounds can be used as a polyamine compound cross-linking agent: e.g. oxaloylhydrazine, succinoylhydrazine, adipoylhydrazine, terephthaloylhydrazine, isophthaloylhydrazine, oxybis(acetohydrazide), thiobis(acetohydrazide), 3,3'-[methylenebis(1,4-phenyleneoxy)]dipropionedihydrazide, carbonohydrazide, thiocarbonohydrazide, oxaimidehydrazide, 2,4-pyridinedicarbohydrazoneamide, 1,3-bezenesulfonylhydrazide, 4,4'-oxybis(benzenesulfonylhydrazide), etc.

The polyamine compound cross-linking agent can be used in proportion of about 0.2 to about 4 parts by weight, preferably about 0.5 to about 3 parts by weight to 100 parts by weight of butenedioic acid monoalkyl ester-copolymerized acrylic elastomer. When a proportion of the cross-linking agent to be used is less than about 0.2 parts by weight, vulcanization will be unsatisfactory, resulting in failure to obtain satisfactory compression set characteristics, whereas in a higher proportion than about 4 parts by weight scorching will occur.

When the polyamine compound cross-linking agent is used, it is preferable to use a guanidine compound, a sulpheneamide compound or a tertiary amine as a vulcanization accelerator at the same time in a proportion of about 0.5 to about 15 parts by weight, preferably about 1 to about 10 parts by weight, to 100 parts by weight of butenedioic acid monoalkyl ester-copolymerized acrylic elastomer.

Guanide compound includes, for example, guanidine, aminoguanidine, 1,1,3,3-tetramethylguanidine, 1,1,3,3-tetraethylguanidine, 1-phenylguanidine, 1,3-diphenylguanidine, triphenylguanidine, 1-benzyl-2,3-dimethylguanidine, 1,3-di-o-tolylguanidine, n-dodecylguanidine, methylolguanidine, dimethylolguanidine, cyanoguanidine, 1,6-guanidinohexane, guanyl urea, biguanide, 1-o-tolyl biguanide, di-o-tolylguanidine salt of dicatechol borate, etc., at least one of which can be used.

Sulpheneamide compound includes those usually used as a vulcanization vulcanization accelerator such as N-cyclohexyl-2-benzolyl sulpheneamide, N-t-butyl-2-benzothiazolyl sulpheneamide, N-oxydiethylene-2-benzothiazolyl sulpheneamide, N,N-dicyclohexyl-2-benzothiazolyl sulpheneamide, etc., at least one of which can be used.

Tertiary amines include, for example, triethylamine, tributylamine, diethylcyclohexylamine, dimethyllaurylamine, tetramethylethylenediamine, tetramethylpropylenediamine, tetramethylhexamethyl enediamine, N,N-dimethylbenzylamine, triphenylamine, triethylenediamine, hexamethylenetetramine, pentamethyldiethylenetriamine, hexamethyltriethylenetetramine, 1,8-diazabicyclo[5,4,0]undecene-7 or its salt, 1,5-diazabicyclo[4,3,0]nonene-5 or its salt, N,N-dimethylaniline, N,N-diethylaniline, pyridine or its substituted compounds, pyrrole or its substituted compounds, methylmorpholine, ethylmorpholine, dimethylpiperadine, diethylpiperadine, etc., at least one of which can be used.

Polyfunctional isocyanate compound or blocked isocyanate can be also used as a cross-linking agent.

Polyfunctional isocyanate compound is represented by the following general formula:

where R is an alkyl group, an alkoxy group, an aryl group, an alkylaryl group, or the like, and n is an integer of 2 or more, and includes, for example, o-toluylene diisocyanate, naphthylene-1,5-diisocyanate, diphenylmethane diisocyanate, triphenylmethane triisocyanate, xylylene diisocyanate, tris(p-isocyanatephenyl) thiophosphite, polymethylenepolyphenyl diisocyanate, chlorophenyl diisocyanate, dimethoxydiphenyl diisocyanate, dimethyldiphenylene diisocyanate, tetramethyldiphenylene diisocyanate, diphenyidiphenylene diisocyanate, dichlorodiphenylene diisocyanate, dimethoxydiphenylene diisocyanate, phenylene diisocyanate, toluene diisocyanate, trans-vinylene diisocyanate, N,N'-(4,4'-dimethyl-3,3'-diphenyidiisocyanate)urethodione, 4,4',4"-trimethyl-3,3',3"-triisocyanate-2,4,6-triphenylcyanurate, hexamethylene diisocyanate, isophorone diisocyanate, trimethylhexamethylene diisocyanate, dicyclohexylmethane diisocyanate, adduct-type hexamethylene diisocyanate, biuret-type hexamethylene diisocyanate, isocyanurate-type hexamethylene diisocyanate, adduct-type tolylene diisocyanate, biuret-type tolylene diisocyanate, isocyanurate-type tolylene diisocyanate, etc.

Blocked isocyanate is obtained by reaction of the aforementioned polyfunctional isocyanate with a blocking agent. Blocking agent includes, for example, amines such as diphenylamine, bis(dimethylbenzyl)diphenylamine, methylphenylamine, ethylphenylamine, isopropylphenylamine, phenylnaphthylamine, naphthylphenylenediamine, diphenylphenylenediamine, dinaphthylphenylenediamine, N-phenyl-N'-methylphenylenediamine, N-phenyl-N'-ethylphenylenediamine, N-phenyl-N'-isopropyl-phenylenediamine, aniline, carbazol, etc.; phenols such as phenol, cresol, xylenol, p-ethylphenol, o-isopropylphenol, p-t-butylphenol, p-t-octylphenol, 2,6-di-t-butyl-4-methylphenol, 2,6-di-t-butyl-4-ethylphenol, methylenebis(ethyl-t-butylphenol), 2,5-di-t-butylhydroquinone, thymol, naphthol, nitrophenol, chlorophenol, etc.; alcohols such as methanol, ethanol, propanol, butanol, ethylene glycol, methyl cellosolve, butyl cellosolve, methyl carbitol, benzyl alcohol, phenyl cellosolve, cyclohexanol, etc.; active methylenes such as dimethyl maloate, diethyl maloate, ethyl acetoacetate, etc.; mercaptans such as butyl mercaptan, lauryl mercaptan, thiophenol, etc.; amides such as acetanilide, acetanisidide, acetamide, benzamide, sulphenamide, etc.; imides such as succinimide, maleimide, etc.; imidazoles such as imidazole, ethylimidazole, mercaptobenzimidazole, etc.; ureas such as urea, ethleneurea, thiourea, etc.; carbamates such as phenyl phenylcarbamate, oxazolidone, etc.; imines such as ethyleneimine, etc., oximes such as formaldoxime, acetaldoxime, methylethylketoxime, cyclohexanonoxime, etc.; guanidines such as diphenylguanidine, ditolylguanidine, tolylbiguanidine, etc., sulfites such as sodium hydrogen sulfite, potassium hydrogen sulfite, etc.; lactams such as ε-caprolactam, etc., and the like. The blocking agent can be selected in view of decomposition temperature, etc., as in the case of polyfunctional isocyanate compounds.

At least one of the polyfunctional isocyanate compounds and blocked isocyanates is used in a proportion of about 0.1 to about 15 parts by weight, preferably about 0.2 to about 8 parts by weight, to 100 parts by weight of butenedioic acid monoalkyl ester-copolymerized acrylic elastomer. In case of lower proportion than about 0.1 parts by weight, vulcanization torque characteristics, normal state physical properties and compression set characteristics will be deteriorated, whereas in case of a higher proportion than about 15 parts by weight scorch improvement effect will be lower.

It is also preferable to use the polyfunctional isocyanate compound or blocked isocyanate together with a vulcanization accelerator. Such a vulcanization accelerator includes, for example, alkali metal salts of inorganic or organic acids, alkali metal hydroxides, quaternary onium salts, guanidine compounds, tertiary phosphines, tertiary amines, sulphenamides, etc. which can be used in a proportion of about 0.5 to about 10 parts by weight, preferably about 1 to about 10 parts by weight, to 100 parts by weight of butenedioic acid monoalkyl ester-copolymerized acrylic elastomer.

Alkali metal salts of inorganic or organic acids include, for example, sodium carbonate, potassium carbonate, sodium stearate, potassium stearate, etc., and alkali metal hydroxides include, for example, sodium hydroxide, potassium hydroxide, etc.

Quaternary onium salts are represented by the following general formulae:

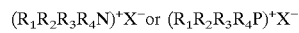

where $R_1$ to $R_4$ are alkyl groups, alkoxyl groups, aryl groups, alkylaryl groups, aralkyl groups or polyoxyalkylene groups, having 1–25 carbon atoms, respectively, two or three of which can form a heterocyclic structure together with N or P, and $X^-$ is such an anion as $Cl^-$, $Br^-$, $I^-$, $HSO_4^-$, $H_2PO_4^-$, $ROSO_2^-$, $CO_3^-$, etc.

Quaternary onium salts include, for example, quaternary ammonium salts such as tetrabutylammonium bromide, tetrabutylammonium chloride, tetrabutylammonium iodide, tetraethylammonium bromide, tetraethylammonium chloride, tetraethylammonium iodide, n-dodecyl-trimethylammonium bromide, octadecyltrimethylammonium bromide, trimethylbenzylammonium bromide, cetyidimethylbenzylammonium chloride, cetylpyridium bromide, cetylpyridium sulfate, tetraethylammonium acetate, trimethylbenzylammonium benzoate, trimethylbenzylammonium borate, 5-benzyl-1,5-diazabicyclo[4,3,0]-5-nonenium chloride, 5-benzyl-1,5-diazabicyclo[4,3,0]-5-nonenium tetrafluoroborate, etc. and quaternary phosphonium salts such as tetraphenylphosphonium chloride, benzyltriphenylphosphonium bromide, benzyltriphenylphosphonium chloride, triphenylmethoxymethylphosphonium chloride, triphenylmethylcarbonylmethylphosphonium chloride, triphenylethoxycarbonylmethylphosphonium chloride, trioctylbenzylphosphonium chloride, trioctylmethylphosphonium chloride, trioctylethylphosphonium acetate, tetraoctylphosphonium chloride, trioctylethylphophonium dimethylphosphate, etc.

The same quanidine compounds, tertiary amines or sulphenamide compounds as mentioned before can be used, and tertiary phosphines includes, for example, triphenylphosphine, tolylphosphine, etc.

Acrylic elastomer composition comprising the aforementioned components as essential components can be further admixed, if required, with a reinforcing agent, a filler, an antioxidant, a stabilizer, a plasticizer, a lubricant, a processing aid, etc. and the composition can be prepared by a kneader, such as open rolls, Banbury mixer, kneader, etc. The thus prepared composition is vulcanized by press vulcanization at about 150° to about 200° C. for about 1 to about 30 minutes and by oven vulcanization (post vulcanization) at about 150° to about 180° C. for about 1 to about 16 hours. The vulcanization molding is carried out by compression molding, injection molding, transfer molding, etc.

The present inventors have found that unreacted butenedioic acid monoalkyl ester, which should be removed in a treatment step following the polymerization but still remains in the acrylic elastomer, is a cause for inhibition of vulcanization reaction at the stage of curing.

The present acrylic elastomer containing a reduced proportion of unreacted butenedioic acid monoalkyl ester on the basis of such a new finding and its composition can give cross-linking products having good vulcanization torque characteristics and stably showing good compression set characteristics, free from metal corrosion problems and can be effectively used as vulcanization molding materials for gaskets, O-lings, packings, oil seals, various hoses, etc.

PREFERRED EMBODIMENTS OF THE INVENTION

Reference Examples 1 To 9

Figure 1:
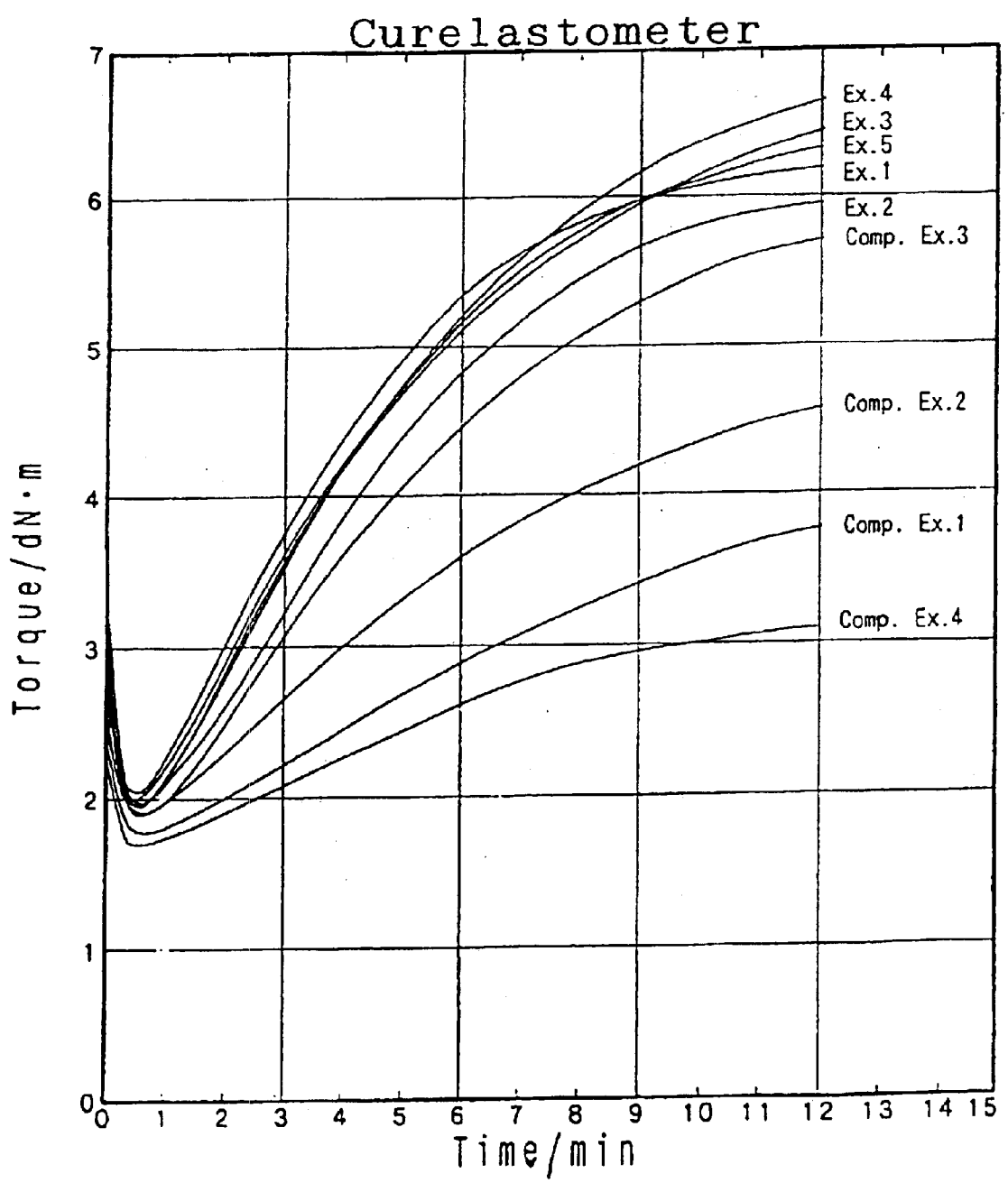
FIG. 1 is a graph showing vulcanization torque curves at a vulcanization temperature of 180° C. in Examples and Comparative Examples.

The following components were charged into a separable flask provided with a thermometer, a stirrer, a nitrogen gas inlet pipe and an evacuation apparatus:

|  | Parts by weight |
|---|---|
| Water | 150 |
| Sodium laurylsulfate | 5.5 |
| Monomer mixture given in Table 1 | 100 |

Then, the flask was subjected to repetitious of air removal and nitrogen gas flushing to thoroughly remove oxygen from the flask, and the following components were added thereto to initiate polymerization reaction at room temperature, and the reaction was continued until the polymerization conversion reached at least 90%:

|  | Parts by weight |
|---|---|
| Sodium formaldehyde sulfoxylate | 0.002 |
| t-Butyl hydroperoxide | 0.005 |

The resulting aqueous latex was solidified in an aqueous sodium chloride solution, followed by water washing and drying to obtain monoalkyl maleate-copolymerized acrylic elastomer. Proportion (mol. %) of unreacted monoalkyl maleate to monoalkyl maleate copolymerized in the resulting copolymer was adjusted by controlling an amount of washing water with respect to the amount of solidified copolymer.

TABLE 1

| Reference Ex. No. | 1 | 2 | 3 | 4 | 5 | 6 | 7 | 8 | 9 | 10 |
|---|---|---|---|---|---|---|---|---|---|---|
| [Monomer; wt. %] | | | | | | | | | | |
| Ethyl acrylate | 37 | 37 | 42 | 42 | 44 | 44 | 44 | 53 | 53 | 44 |
| n-Butyl acrylate | 34 | 34 | 34 | 34 | 34 | 34 | 34 | 42 | 42 | 34 |
| 2-Methoxyethyl-acrylate | 20 | 20 | 17 | 17 | 17 | 17 | 17 | | | 17 |
| Monomethyl maleate | 9 | 9 | | | | | | | | |
| Monoethyl maleate | | | 7 | 7 | | | | | | |
| Mono-n-butyl Maleate | | | | | 5 | 5 | 5 | 5 | 5 | 5 |
| [Copolymer] | | | | | | | | | | |
| Acid value of washed copolymer (mg/g) | 4.5 | 4.5 | 4.9 | 4.9 | 5.1 | 5.1 | 5.1 | 4.9 | 4.9 | 5.1 |
| Copolymerized maleate ester (wt. %) | 1.30 | 1.30 | 1.57 | 1.57 | 1.94 | 1.94 | 1.94 | 1.87 | 1.87 | 1.94 |
| Extracted ester (unreacted) from copolymer (wt. %) | 0.31 | 0.70 | 0.40 | 0.80 | 0.25 | 0.05 | 0.75 | 0.33 | 1.1 | 0.001 |

TABLE 1-continued

| Reference Ex. No. | 1 | 2 | 3 | 4 | 5 | 6 | 7 | 8 | 9 | 10 |
|---|---|---|---|---|---|---|---|---|---|---|
| Unreacted ester/ copolymerized ester (mol. %) | 23.8 | 53.8 | 25.5 | 51.0 | 12.9 | 2.6 | 38.7 | 17.6 | 58.8 | 0.05 |

Notes)
Acid value of washed copolymer: determined by washing finely pulverized copolymer with a large amount of flowing water, dissolving the washed copolymer into acetone, reprecipitating the copolymer in an aqueous methanol solution, followed by water washing and drying and titrating the dried copolymer by neutralization titration An amount of copolymerized maleate ester: calculated from the above acid value An amount of extracted (unreacted) maleate ester from the copolymer: quantitatively determined by exactly weighing out about 1 g of finely pulverized copolymer into a 30-ml, tightly closed glass vessel, adding about 10 ml of diisopropyl ether thereto, weighing total weight, shaking the solution for one day, sampling 2 ml of the solution, adding an internal standard solution and analyzing the extracted maleate ester by a gas chromatographic working curve Examples 1 to 5 and Comparative Examples 1 To 4

|  | Parts by weight |
|---|---|
| Acrylic elastomer of Ref. Ex. 1 | 100 (Ex. 1) |
| Acrylic elastomer of Ref. Ex. 2 | 100 (Comp. Ex. 1) |
| Acrylic elastomer of Ref. Ex. 3 | 100 (Ex. 2) |
| Acrylic elastomer of Ref. Ex. 4 | 100 (Comp. Ex. 2) |
| Acrylic elastomer of Ref. Ex. 5 | 100 (Ex. 3) |
| Acrylic elastomer of Ref. Ex. 6 | 100 (Ex. 4) |
| Acrylic elastomer of Ref. Ex. 7 | 100 (Comp. Ex. 3) |
| Acrylic elastomer of Ref. Ex. 8 | 100 (Ex. 5) |
| Acrylic elastomer of Ref. Ex. 9 | 100 (Comp. Ex. 4) |
| Stearic acid | 1 |
| 4,4'-bis(α,α-dimethylbenzyl)diphenylamine (Noclak CD, product made by Ouchi-Shinko Kagaku K. K.) | 2 |
| HAF carbon black | 60 |
| Methylene dianiline | 0.5 |

-continued

|  | Parts by weight |
|---|---|
| Di-o-tolyl guanidine (Nocceler DT, product made by Ouchi-Shinko Kagaku K. K.) | 1 |

The foregoing components were kneaded through open rolls, and the kneaded compositions were subjected to press vulcanization at 180° C. for 8 minutes and gear oven vulcanization at 175° C. for 4 hours to determine vulcanization torque characteristics and vulcanization physical properties. The results are shown in Table 2.

Vulcanization torque characteristics: $M_e = M_H - M_L$ (see FIG. 1)

Normal state physical properties: according to JIS K-6301

Compression set: 25% compression at 150° for 70 hours

TABLE 2

| Measurement items | Ex. 1 | Comp. Ex. 1 | Ex. 2 | Comp. Ex. 2 | Ex. 3 | Ex. 4 | Comp. Ex. 3 | Ex. 5 | Comp. Ex. 4 |
|---|---|---|---|---|---|---|---|---|---|
| [Vulcanization characteristics] | | | | | | | | | |
| $M_e$ (dN · m) | 4.2 | 2.0 | 3.9 | 2.7 | 4.5 | 4.6 | 3.8 | 4.3 | 1.4 |
| [Normal state physical properties] | | | | | | | | | |
| Hardness (JIS A) | 71 | 65 | 74 | 66 | 70 | 70 | 69 | 68 | — |
| 100% Modulus (MPa) | 4.2 | 2.5 | 4.3 | 2.7 | 4.4 | 4.4 | 3.8 | 4.1 | — |
| Tensile strength at break (MPa) | 14.5 | 12.5 | 14.8 | 13.2 | 14.7 | 14.6 | 14.1 | 14.0 | — |
| Tensile elongation at break (%) | 270 | 330 | 280 | 310 | 260 | 260 | 290 | 270 | — |
| [Compression set] | | | | | | | | | |
| 150° C. for 70 hours (%) | 18 | 39 | 17 | 31 | 12 | 11 | 22 | 14 | — |

Note)
—: Molding failure

Comparative Example 5

The following components were added to 100 parts by weight each of acrylic elastomers of Reference Examples of 5, 6 or 10.

|  | Parts of weight |
|---|---|
| Stearic acid | 1 |
| 4,4-bis(α,α-dimethylbenzyl)diphenylamine | 2 |
| HAF carbon black | 60 | kneaded with Banbury mixer and time until particles of carbon black mixed therein as a reinforcing filler were finely pulverized to average particle sizes, i.e. BIT (black incorporation time), was measured as an efficiency of kneading rate. BIT of composition blend containing acrylic elastomer of Reference Example 5 was found to be 5.5 min., that of Reference Example 6 was 6.2 min., and that of Reference Example 10 was 11.0 min.

What is claimed is:

1. A method of producing a butenedioic acid monoalkyl ester-copolymerized acrylic elastomer which contains 0.1–30% by mole of unresated butenedioic acid monoalkyl ester on the basic of carboxyl groups copolymerized in the acrylic elastomer, which method comprises:

determining an amount of butenedioic acid monoalkyl ester copolymerized in a butenedioic acid monoalkyl ester-copolymerized acrylic elastomer; and adjusting the amount of unreacted butenedioic acid monoalkyl ester in the acrylic elastomer to 0.1–30% by mole on the basis of carboxyl groups copolymerized in the acrylic elastomer to improve compression set characteristics of cross-linking product of the acrylic elastomer.

2. A method of producing a butenedioic acid monoalkyl ester-copolymerized acrylic elastomer according to claim 1, wherein the butenedicic acid monoalkyl ester is a monoalkyl maleate.

3. A method of producing a butenedioic acid monoalkyl ester-copolymerized acxylic elastomer according to claim 1, wherein the acrylic elastomer is a copolymer of at least one of alkyl acrylate and alkoxyalkyl acrylate with a butenedioic acid monoalkyl ester.

4. A method of producing a butenedioic acid monoalkyl ester-copolymerized acrylic elastomer according to claim 3, wherein the acrylic elastomer is further copolymerized with a vinyl monomer.

* * * * *